UNITED STATES PATENT OFFICE.

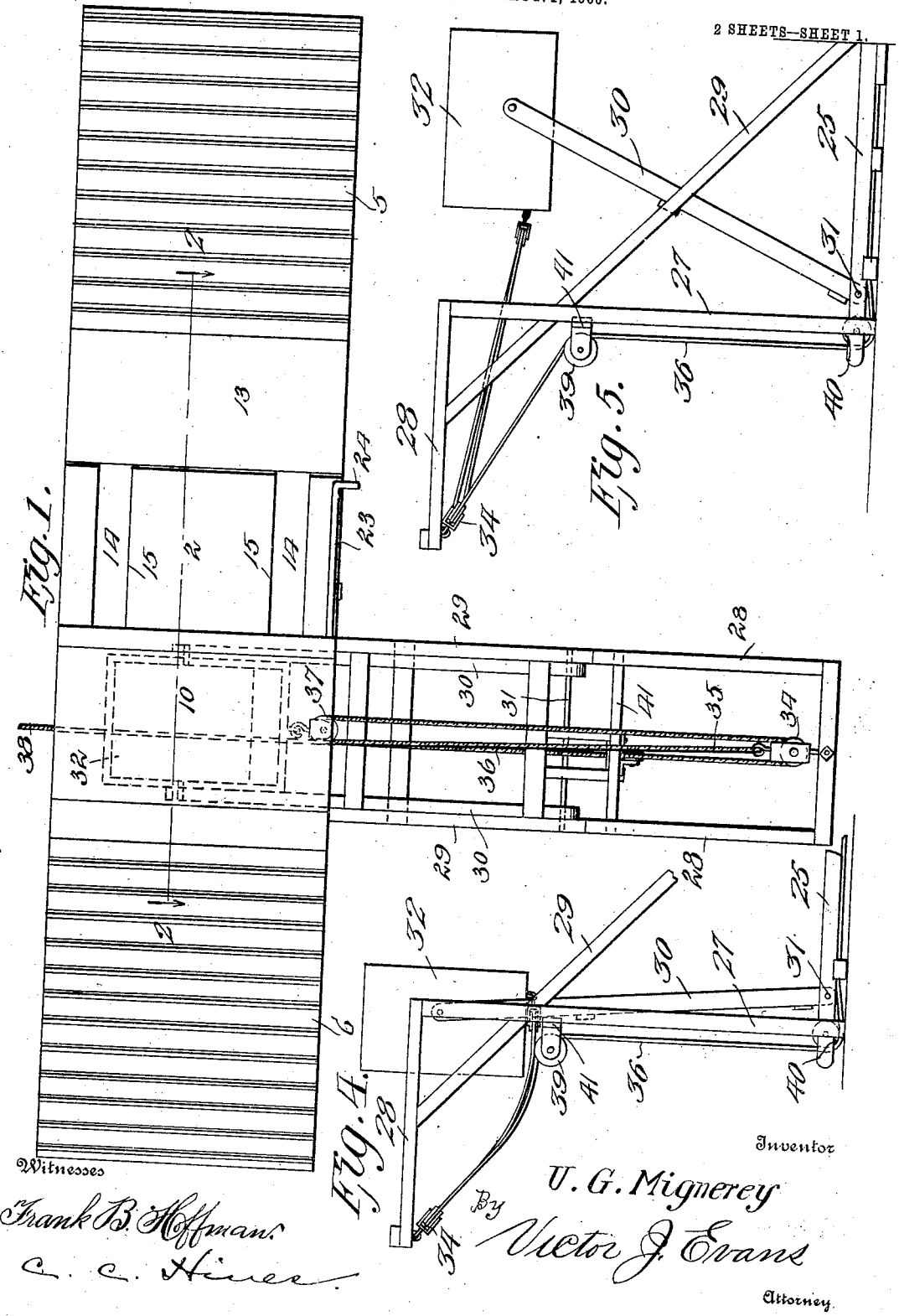

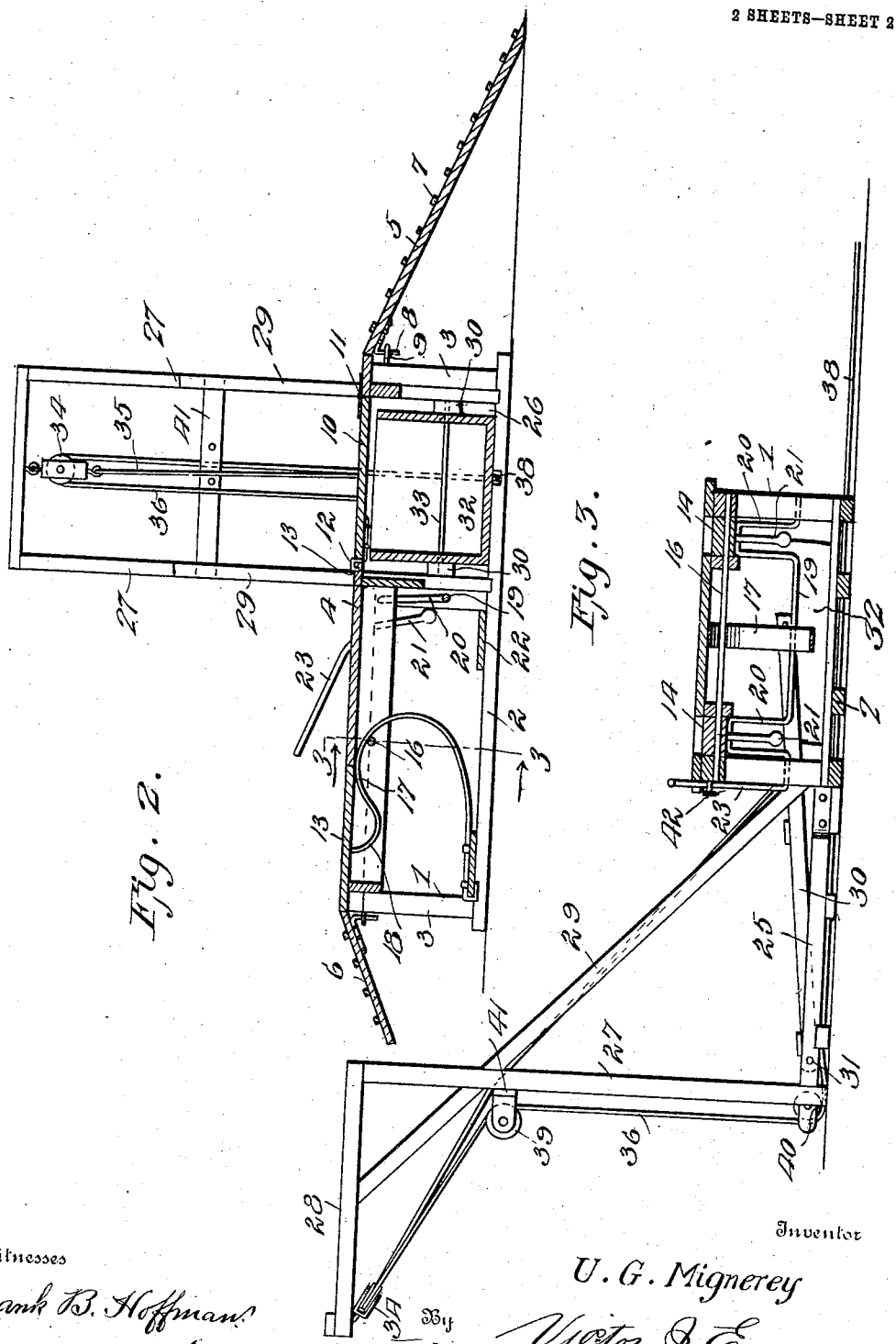

ULYSSES G. MIGNEREY, OF JULIAN, NEBRASKA.

UNLOADING APPARATUS.

No. 841,996.　　　　　　Specification of Letters Patent.　　　　　　Patented Jan. 22, 1907.

Application filed August 1, 1906. Serial No. 328,801.

*To all whom it may concern:*

Be it known that I, ULYSSES G. MIGNEREY, a citizen of the United States, residing at Julian, in the county of Nemaha and State of Nebraska, have invented new and useful Improvements in Unloading Apparatus, of which the following is a specification.

This invention relates to an apparatus for unloading corn and other substances from wagons and depositing the same in a crib, elevator, or other storehouse or into cars or boats for transportation, the object of the invention being to provide a simple construction of apparatus of this character whereby the operation of dumping the material from the wagons and depositing the same into the intended receptacle may be quickly, conveniently, and efficiently carried out.

With the above and other objects in view the invention consists of the novel construction, combination, and arrangement of parts hereinafter fully described and claimed, reference being had to the accompanying drawings, in which—

Figure 1 is a top plan view of the apparatus. Fig. 2 is a vertical longitudinal section of the same, taken on line 2 2 of Fig. 1. Fig. 3 is a vertical cross-section taken on line 3 3 of Fig. 2. Figs. 4 and 5 are views showing the positions of the bucket as it nears and reaches a dumping-point.

Referring to the drawings, 1 designates a suitable supporting-frame comprising a base or foundation portion 2 and uprights 3 rising therefrom and having mounted thereon a suitable platform 4, across which the wagons or carts which are to be emptied of their contents are driven, said platform being provided with an inclined approach 5 and an inclined descent 6, located at the opposite ends thereof and which may be fastened thereto in any preferred manner. These ascending and descending portions may be in the form of boards provided with cross-strips 7, forming a grated surface in order to allow the draft-animals to obtain a secure foothold, and, if desired, such boards may be detachably secured to the frame 1, as by providing the same with hooks or engaging members 8 to interlock with keepers 9 on the frame, thus allowing the parts to be disconnected to permit the apparatus to be conveniently transported from place to place.

The platform is provided adjacent the end to which the inclined approach 5 is attached with an opening closed by a door 10, hinged or pivoted at its outer end at one side of the opening, as indicated at 11, and provided at its inner end with one or more catches 12 to engage keeper-recesses 13, formed in a fixed portion of the platform at the opposite end of the door-opening. The opposite end of the platform, or that portion adjacent the descent 6, is formed by the main section 13 of a trap or dumping device, which main section is provided with rearwardly-extending arms 14, adapted when the trap is in closed position to occupy slots 15 in the fixed portion of the platform and to lie flush with the surface of the latter.

The trap or dumping device is pivotally mounted upon a cross-rod 16, fixed in the sides of the frame, and said platform is adapted to be tilted through the medium of an operating-spring 17. This spring is of strap form and is secured at one end to the base of the frame, thence bent or looped around the rod 16 and adapted to be confined between the same and the adjacent stationary portion of the platform, and has its free end 18 arranged to bear upon the under side of the main section 13 of the trap or dumping device, whereby when said trap or dumping device is free for movement the spring will project the section 13 upward and the arms 14 downward. The function of this trap or dumping device is to support the wagon or cart which is to be unloaded of its contents, the wheels of the cart or rear wheels of the wagon being arranged to rest upon the arms 14, so that the trap in tilting will incline the vehicle-body to lower the rear end thereof for the discharge of the substances by gravity down through the opening closed by the door 10.

The trap is adapted to be held and locked in normal position by locking and releasing means comprising a rock-shaft 19, journaled in the sides of the frame and provided with a pair of cranks or locking members 20, adapted to project under the inner or rear ends of the arms 14, as shown in Figs. 2 and 3, to hold the trap in normal position against the action of the spring 17. The opening movement of the trap is limited by projections 21, depending from the inner ends of the arms, which projections are adapted to abut against a board 22 on the base of the platform, the closing movement of the trap being limited and determined by the movement of the section 13 down upon the upper portion of the supporting-frame. The shaft 19 is provided at one end with an operating hand-lever 23, terminating at its forward end in a handle 24. This lever is angularly bent in a forward direction, so that it will act in the nature of an eccentric lying beyond the axis of the shaft to normally hold the latter from rearward movement, so that the cranks or locking members 20 when in operative position will be held beneath the arms 14 under all normal conditions of service.

Arranged on one side of the platform is an elevating device comprising a base-frame 25, which extends at its inner end into the chamber or compartment 26 of the main frame beneath the door 10, and may be detachably fastened to said frame in any preferred manner. From the outer end of the base 25 rise uprights 27, supporting at their upper ends an outwardly-extending head frame or portion 28, said uprights and head-frame being reinforced and connected with the base 25 by struts or braces 29. A tilting elevating-frame 30 is pivoted at its outer end, as at 31, to the base 25, and carries at its inner or free end a bucket or receptacle 32, pivotally mounted between the arms or beams thereof on a supporting-rod 33, the pivot-point being slightly below and in rear of the center of gravity of the bucket. Mounted on the head-frame 28 is a guide-pulley 34, to the block or frame of which is fastened one of the ends 35 of an operating or controlling cord or cable 36, which thence extends around a pulley 37, fastened to the rear wall of the bucket 32, slightly below the horizontal center thereof, and passes back in the form of a loop around the pulley 34, and is finally continued to provide an operating portion 38, extending downwardly over guide-pulleys 39 and 40 and beneath the frame 25 and door 10 to the front side of the frame 1. The elevating-frame 30 is adapted when the door 10 is open to swing vertically down into and out of the chamber 26 and is normally held in lowered position with the bucket in receiving position in said chamber by the weight thereof.

In operation the wagon or cart to be emptied is driven up the approach 5 onto the platform 2, with the rear wheels of the wagon or wheels of the cart resting upon the arms 14 of the trap-door or dumping device. After the cart or wagon is so disposed upon the platform the door 10 is swung open, leaving the bucket 32 exposed, and then the lever 23 is tilted rearwardly, thus throwing the locking members or cranks 20 out of engagement with the arms 14, whereupon the weight of the vehicle serves to tilt the trap or dumping device. This operation tilts or inclines the vehicle-body rearwardly, so that when the end-gate thereof is open the corn or other substance contained therein will discharge by gravity into the bucket 32. After the vehicle has been emptied of its contents it is driven off the platform and down the descent 6, its weight in passing over the main section 13 of the trap serving to restore the latter to normal position, so that the attendant can conveniently reset the rock-shaft to dispose the locking members 20 to hold the trap in such position. The elevator is then operated by drawing upon the section 38 of the rope or cable thereof by manual means or suitable power to swing the elevating-frame upwardly, the pull of the cable on the bucket 32 serving to hold the same in a horizontal position until the resistance of the cable to its tilting action ceases, whereupon the bucket will automatically tilt to discharge its contents through the door of a crib or storehouse or into an underlying car or boat. The upward movement of the frame 30 is limited by a cross-bar 41, extending between the standards 27, thus holding said frame 30 a little outwardly beyond the perpendicular, so that it will maintain its elevated position until again thrown rearwardly beyond the perpendicular, so that it can descend by gravity, its speed of descent being regulated through the action of the controlling-cable. It will be apparent that the first pull of the cable upon the bucket will tilt the bucket to an upwardly-inclined position, in which it will be maintained by the pulling strain, and that the continued motion of the cable will swing the elevating-frame upwardly and outwardly. When the free end of the elevating-frame reaches approximately the limit of its movement, the bucket will lie slightly below the plane of the pulley 34, and the pull thereon will be transmitted in a nearly straight line, thus bringing the bucket to a horizontal position, in which position it will be maintained by the nearly straight pull of the cable until the elevating-frame reaches a substantially vertical position, when the bucket will begin to tilt downwardly and forwardly under the weight of its contents and the frame will fall forwardly by gravity until its motion is arrested by the stop-bar 41, thus causing a quick slack in the cable, whereby the bucket is permitted to tilt by gravity to a full dumping position. The position of the bucket as it nears and reaches the dumping-point is clearly shown in Figs. 4 and 5, from which it will be apparent that the quick outward swing of the elevating-frame when it passes beyond the vertical and until it engages the stop-bar 41 causes the bucket to move at a more rapid rate of speed than the cable, whereby a slack occurs in a portion of the cable between the pulleys 34 and 37 and the resistance of the cable to tilting action of the bucket is removed. After the dumped load has been elevated and discharged and the bucket has been again swung down into receiving position in the compartment 26 the door 10 is again closed to reset the apparatus for unloading a second vehicle in the manner previously described.

If desired, a suitable stop 42 may be provided upon the frame 1 to limit the forward swinging movement of the lever-arm 23.

It will be seen from the foregoing description, taken in connection with the drawings, that the invention provides a simple, convenient, and effective form of apparatus for unloading carts or similar vehicles and conveying the load to a suitable point of deposit or into an intended receptacle, the operation being such that the apparatus will automatically tilt the vehicles to dump the load, thus wholly obviating the use of labor for that purpose. The approach 5, descent 6, and elevator are preferably detachably connected so that the apparatus may be conveniently transported from place to place for use, for which purpose the frame 1 may be mounted upon a suitable wheeled truck or provided with supporting-wheels, which may be detached or folded up, so that it may rest squarely upon the ground to secure a firm support when the apparatus is in operation.

Having thus described the invention, what is claimed as new is—

1. An unloading apparatus comprising a platform having an opening therein, a door forming a portion of the platform for closing said opening, a trap or dumping device adapted to be automatically operated by the vehicle, whereby the latter may be tilted to discharge its contents through said opening, means for holding the platform in normal position and releasing it, a receptacle disposed below the opening in the platform, and a swinging elevator carrying said receptacle and movable through the opening.

2. An unloading apparatus comprising a frame having a platform or runway provided with an opening, a door for normally closing said opening, a tilting trap or dumping device forming part of the platform and adapted to be automatically actuated by the vehicle, whereby the latter may be tilted to discharge its contents through said opening, spring means for tilting the trap, means for normally holding the trap in normal position and releasing it for operation, a receptacle below the opening in the platform, and means for elevating said receptacle through said opening.

3. A device for unloading wagons and delivering the contents thereof, comprising a frame having a platform provided with an opening therein, a door for normally closing said opening, a trap or vehicle-tilting device upon the platform, means for normally holding said trap in closed position, means for tilting it upon the release of said holding means, a swinging elevator movable through said opening, a dumping-receptacle pivotally mounted upon the elevator, and means for swinging said elevator and controlling the action of said receptacle.

4. An apparatus for unloading vehicles and conveying the contents thereof to a desired point, comprising a frame having a platform or runway provided with an opening therein, a door for normally closing said opening, a tilting platform-section adapted to support the vehicle when the latter is in discharging position, means for holding said section in normal position, means for tilting said section when said holding means is released, a receptacle arranged below the opening in the platform and movable through the same, a swinging elevator carrying said receptacle and movable through said opening, and means for controlling the action of said elevator and receptacle.

5. An apparatus for unloading vehicles and conveying the contents thereof to a desired point, comprising a frame having a platform provided with an opening therein, a door for normally closing said opening for the passage of the vehicle thereover, means upon the platform for tilting the vehicle so that its contents may discharge by gravity through said opening, a swinging elevator movable through the opening, a bucket carried by said elevator, and means for controlling the action of the elevator and bucket.

6. An apparatus for unloading vehicles and conveying the contents to a desired point of discharge, comprising a frame having a platform provided with an opening therein, a door for normally closing said opening for the passage of the vehicle thereover, a tilting platform-section adapted to support the vehicle when the latter is arranged in discharging position, said section comprising a main portion and arms, a rock-shaft having operating means and provided with members movable under said arms to maintain said tilting platform-section in normal position, means for tilting the platform when said operating elements are thrown out of the path of movement of the arms, a receptacle arranged below the opening in the platform, and an elevator for swinging said receptacle through the opening to a desired point.

In testimony whereof I affix my signature in presence of two witnesses.

ULYSSES G. MIGNEREY.

Witnesses:
W. E. YOUNG,
ARTHUR BROWN.